United States Patent
Cobb et al.

(10) Patent No.: US 11,286,764 B2
(45) Date of Patent: Mar. 29, 2022

(54) SYSTEM AND METHOD FOR STREAMING DATA

(71) Applicant: ConocoPhillips Company, Houston, TX (US)

(72) Inventors: Bradford L. Cobb, Houston, TX (US); Stacey C. Ramsay, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 16/364,553

(22) Filed: Mar. 26, 2019

(65) Prior Publication Data

US 2019/0292895 A1    Sep. 26, 2019

Related U.S. Application Data

(60) Provisional application No. 62/648,123, filed on Mar. 26, 2018.

(51) Int. Cl.
*E21B 44/00* (2006.01)
*H04L 12/819* (2013.01)
*H04L 47/21* (2022.01)

(52) U.S. Cl.
CPC .............. *E21B 44/00* (2013.01); *H04L 47/21* (2013.01)

(58) Field of Classification Search
CPC ....... G05B 23/0294; G05B 23/02; H04L 1/18; H04L 47/21; H04L 29/08; H04B 17/309; H04B 17/318; E21B 44/00
See application file for complete search history.

(56) References Cited

U.S. PATENT DOCUMENTS

| | | |
|---|---|---|
| 2009/0224941 A1 | 9/2009 | Kansal et al. |
| 2012/0290266 A1 | 11/2012 | Jain et al. |
| 2013/0106615 A1 | 5/2013 | Prammer |
| 2013/0279714 A1* | 10/2013 | Mammone .............. G10L 19/26 381/77 |
| 2016/0043957 A1* | 2/2016 | Mendez ................ H04L 65/605 370/252 |

FOREIGN PATENT DOCUMENTS

| | | | |
|---|---|---|---|
| EP | 3136652 A1 | 3/2017 | |
| WO | WO-2018029454 A1 * | 2/2018 | ........... G06N 3/0454 |

OTHER PUBLICATIONS

International Preliminary Report on Patentability for International Application No. PCT/US2019/023978 dated Sep. 29, 2020, 6 pages.
International Search Report and Written Opinion for International Application No. PCT/US2019/23978 dated Jun. 10, 2019, 8 pages.
Supplementary European Search Report for Application No. EP 19 77 7723 dated Sep. 9, 2021 (8 pages).

* cited by examiner

*Primary Examiner* — Iqbal Zaidi
(74) *Attorney, Agent, or Firm* — Polsinelli PC (57) ABSTRACT

A system and method to conform data flow are provided. The system includes a queue configured to receive at least one data stream, and a processor configured to convert the at least one data stream to a continuous data stream, and output the continuous data stream at a constant rate.

15 Claims, 9 Drawing Sheets

SYSTEM AND METHOD FOR STREAMING DATA

CROSS-REFERENCE TO RELATED APPLICATION

This application claims the benefit of U.S. Provisional Application Ser. No. 62/648,123, filed Mar. 26, 2018, which is incorporated herein by reference in its entirety.

BACKGROUND

1. Field of the Invention

The present inventive concept relates to a system and method for streaming data. In particular, the present inventive concept concerns a system and method related to outputting a continuous data stream irrespective of a number of data streams entering the system or differences in dataflow rates between the data streams.

2. Description of Related Art

Conventional drilling rig systems process data received from sensors to control and monitor drilling operations. The data is received from the sensors via multiple data streams, which presents a number of challenges. For instance, the multiple data streams may provide sensor data at different dataflow rates, which may translate to disjointed control and monitoring of the drilling rig during drilling operations.

Accordingly, there is a need for a system and method to improve dataflow that improves real-time control and monitoring during drilling operations.

SUMMARY

The present inventive concept provides a system and method for receiving a plurality of data streams and outputting a continuous data stream regardless of a number of data streams entering the system or differences in dataflow rates between the data streams.

The aforementioned may be achieved in an aspect of the present inventive concept by providing a system configured to conform data flow. The system may include a queue configured to receive at least one data stream. The at least one data stream may include a plurality of data streams. The queue may include a plurality of enqueues and/or a dequeue. Each of the plurality of data streams may be received via a respective one of the plurality of enqueues. Each of the plurality of data streams may be received in real time and/or at different rates.

The system may also include a processor configured to convert the at least one data stream to a continuous data stream. The queue may also be configured to output the continuous data stream at a constant rate and/or in real time via the dequeue. The constant rate may be selectively determined via a clock. The constant rate may be selectively determined to be 100 Hz (100 packets per second). The constant rate may be independent from or unrelated to each rate at which each of the plurality of data streams are received via the respective one of the plurality of enqueues.

The system may be configured to maintain the constant rate by introducing one or more new data packets into the continuous data stream. Each of the one or more new data packets may be a copy of one or more previous data packets. Each of the one or more new data packets may be one or more empty data packets. Each of the one or more new data packets may be a copy of one or more previous data packets and one or more empty data packets. The system may be configured to indicate a change in data received via the at least one data stream by introducing one or more new data packets into the continuous data stream. The system may be configured to indicate a change in data received via the at least one data stream by removing one or more new data packets from the continuous data stream. The new data packet may be introduced into the continuous data stream if a data point is not received by the queue via the at least one data stream or the at least one stream is missing a data point.

The aforementioned may be achieved in another aspect of the present inventive concept by providing a method to conform data flow. The method may be executed utilizing the system. The method may include the step of receiving, via a queue, at least one data stream. The at least one data stream may include a plurality of data streams. The queue may include a plurality of enqueues and/or a dequeue. Each of the plurality of data streams may be received via a respective one of the plurality of enqueues. Each of the plurality of data streams may be received in real time and at different rates.

The method may also include the step of converting, via a processor of the system, the at least one data stream to a continuous data stream. The method may also include the step of outputting, from the queue, via the processor of the system, the continuous data stream at a constant rate. The constant rate may be selectively determined via a clock. The constant rate may be, via the clock, is 100 Hz (100 packets per second). The constant rate may be independent from each rate at which each of the plurality of data streams are received via the respective one of the plurality of enqueues. The system, via the processor and/or the queue, may be configured to maintain the constant rate by introducing one or more new data packets into the continuous data stream. The system, via the processor and/or the queue, may be configured to indicate a change in data received via the at least one data stream by introducing one or more new data packets into the continuous data stream. Each of the one or more new data packets may be a copy of one or more previous data packets. Each of the one or more new data packets may be one or more empty data packets. Each of the one or more new data packets may be a copy of one or more previous data packets and one or more empty data packets. Each of the one or more new data packets may be introduced into the continuous data stream if one or more data points are not received by the queue via the at least one data stream.

The foregoing is intended to be illustrative and is not meant in a limiting sense. Many features of the embodiments may be employed with or without reference to other features of any of the embodiments. Additional aspects, advantages, and/or utilities of the present inventive concept will be set forth in part in the description that follows and, in part, will be apparent from the description, or may be learned by practice of the present inventive concept.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present inventive concept. It should be understood, however, that the present inventive concept is not limited to the precise embodiments and features shown. The accompanying drawings, which are incorporated in and constitutes a part of this specification, illustrates an implementation of apparatuses consistent with the present inventive concept and, together with the description, serves to explain advantages and principles consistent with the present inventive concept, in which.

DETAILED DESCRIPTION

The following detailed description references the accompanying drawings that illustrate various embodiments of the present inventive concept. The illustration and description are intended to describe aspects and embodiments of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

I. Terminology

In the description, phraseology and terminology are employed for the purpose of description and should not be regarded as limiting. For example, the use of a singular term, such as "a", is not intended as limiting of the number of items. Also, any one of the features of the present inventive concept may be used separately or in combination with any other feature. For example, references to the term "embodiment" means that the feature or features being referred to are included in at least one aspect of the present inventive concept. Separate references to the term "embodiment" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present inventive concept as described herein are not essential for its practice.

Further, in certain situations, the term "logic" refers to hardware, firmware, software, and/or a combination thereof that is configured to perform one or more functions including, but not limited to, those functions of the present inventive concept specifically described herein or are readily apparent to those skilled in the art in view of the description. Such logic may include circuitry having data processing and/or storage functionality. Examples of such circuitry may include, but are not limited to, a microprocessor, one or more processors, e.g., processor cores, a programmable gate array, a microcontroller, an application specific integrated circuit, a wireless receiver, transmitter and/or transceiver circuitry, semiconductor memory, or combinatorial logic. Logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical or other form of propagated signals such as carrier waves, infrared signals, or digital signals. Examples of non-transitory storage medium may include, but are not limited or restricted to a programmable circuit, a semiconductor memory, non-persistent storage such as volatile memory, e.g., any type of random access memory "RAM", persistent storage such as non-volatile memory, e.g., read-only memory "ROM", power-backed RAM, flash memory, phase-change memory, etc., a solid-state drive, hard disk drive, an optical disc drive, or a portable memory device. As firmware, the executable code is stored in persistent storage.

The term "operator" is generally used herein to represent a user of the system and/or method of the present inventive concept. For purposes herein, the user may be an administrator of the system, a drilling engineer, or a team of engineers.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture

Figure 1A:
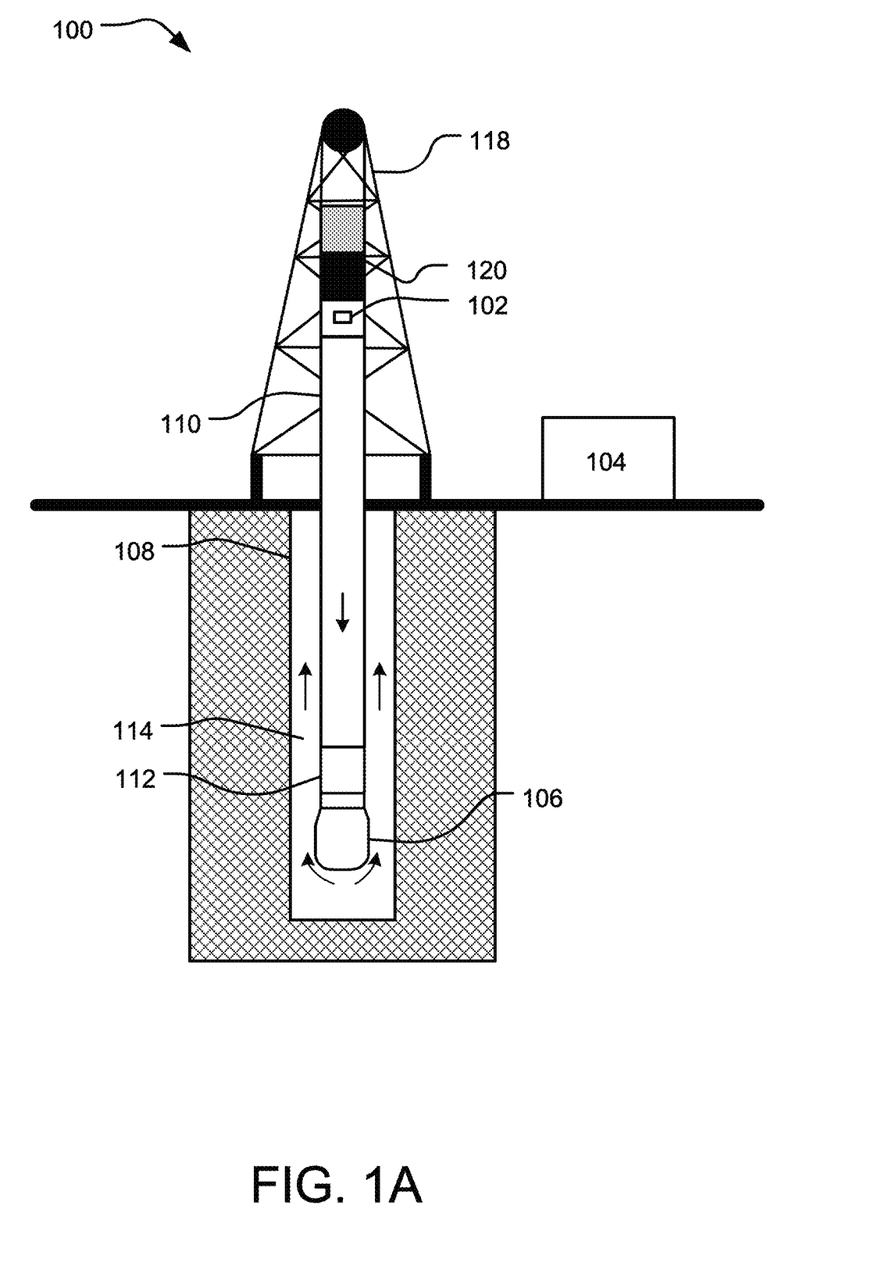
FIG. 1A is a diagram illustrating a system of the present inventive concept with a drilling rig, one or more surface sensors, and supporting facilities in use with a wellbore and drill string.
Figure 1B:
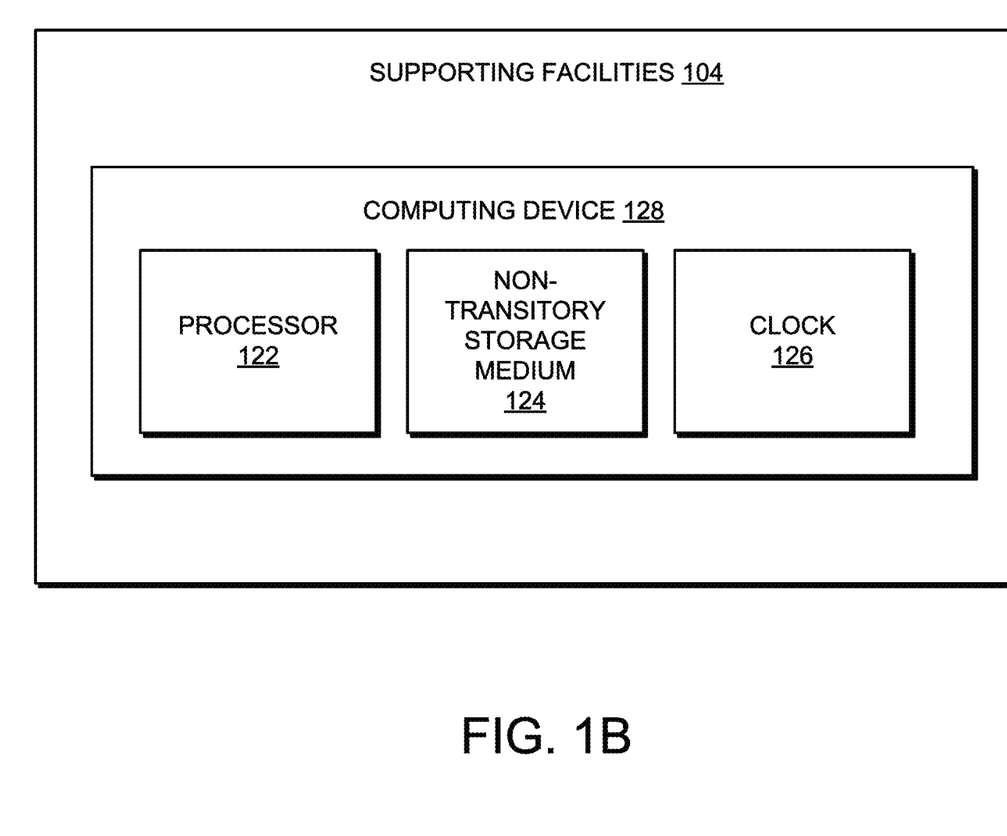
FIG. 1B is a diagram illustrating the supporting facilities of FIG. 1A having a computing device and a clock.

Turning to FIGS. 1A-1B, a drilling system 100 of the present inventive concept is illustrated in use with a drilling rig 118 having a top drive motor 120 at a surface of a wellbore 108. The drilling rig 118 includes a drill string 110 extending into the wellbore 108 with one or more surface sensors 102 and supporting facilities 104 positioned at a top of the wellbore 108. The wellbore 108 extends into the ground and is formed via a drilling operation using the drill string 110. A depth of the wellbore 108 can range from a few feet to over a mile into the ground and can extend in one or more directions. The drill string 110 includes a drill pipe and a bottom hole assembly (BHA) 112 positioned at a bottom of the drill string 110. The BHA 112 can include a plurality of components. In the exemplary embodiment, the BHA 112 includes a steering unit, a mud motor, a drill motor, a drill collar, and a drill bit 106. It is foreseen that the BHA 112 may include fewer or additional components without deviating from the scope of the present inventive concept. The drill string 110 extends into the wellbore 108 so that the drill bit 106 of the BHA 112 is in contact with a geological formation to crush and/or scrape the geological formation, thereby increasing a length of the wellbore 108 in a downward direction, a lateral direction, and/or any other suitable direction. In the exemplary embodiment, the drill bit 106 is driven by the top drive motor 120 and/or the mud motor positioned near the drill bit 106. It is foreseen, however, that the drilling rig 118 may use a kelly drive or a rotary table to drive the drill bit 106 without deviating from the scope of the present inventive concept.

A drilling mud or a drilling fluid 114 can be continuously circulated within the wellbore 108 via a pump to facilitate operation of the BHA 112, e.g., drilling. The drilling fluid 114 can be introduced into the drill string 110 via an opening of the drill string 110 and pumped down the drill string 110 via the pump. The drilling fluid 114 exits the drill string 110 through the drill bit 106 and circulates upwards through an annulus of the wellbore 108. The drilling fluid 114 has multiple functions including, but not limited to, cooling the drill bit 106, lubricating the drill bit 106, and/or transporting debris generated by the drill bit 106 away from the drill bit 106, e.g., up the annulus of the wellbore 108 and to the surface of the wellbore 108. The drilling fluid 114 may be water, oil, a synthetic based composition, gas, or a combination thereof, and may include one or more additives and/or particles.

Each of the one or more surface sensors 102 are configured to measure drilling data, for example, a surface torque of the drill string 110 may yield a data stream of the drill string torque. It is foreseen that the surface sensors 102 may be configured to measure vibration, weight on bit (WOB), lateral acceleration, rotations per minute (RPM), tension, flow rate, temperature, pressure, or any other suitable data related to the drill string 110 during drilling that can be measured from the surface without deviating from the scope of the present inventive concept. It is foreseen that the one or more surface sensors 102 may be, or include, a strain gauge, accelerometer, gyroscope, and/or seismometer without deviating from the scope of the present inventive concept. It is foreseen that the one or more surface sensors 102 may be configured to measure same or different data relative to each other.

In the exemplary embodiment, the one or more surface sensors 102 are positioned on the drill string 110, at or adjacent to the top of the drill string 110 at the surface of the wellbore 108, but it is foreseen that the one or more surface sensors 102 can be positioned along any portion of the drill string 110 proximate to or above the surface of the wellbore 108 without deviating from the scope of the present inventive concept. For instance, it is foreseen that the one or more surface sensors 102 can be in a sub positioned under the top drive motor 120 and above the drill string 110 without deviating from the scope of the present inventive concept.

The supporting facilities 104, as illustrated in FIG. 1B, include a computing device 128. The computing device 128 includes a processor 122 and a non-transitory storage medium 124. The computing device 128 is configured to communicate with the surface sensors 102. In the exemplary embodiment, the drilling data is transmitted from the surface sensors 102 to the non-transitory storage medium 124 via a wireless connection of a wireless network, although it is foreseen that the drilling data can be transmitted continuously to the non-transitory storage medium 124 via a wired connection, for example a wire and/or optical fiber, without deviating from the scope of the present inventive concept. The non-transitory storage medium 124 tangibly stores a plurality of data streams for processing by the processor 122. Each of the plurality of data streams is generated by and received from one of the surface sensors 102.

The processor 122 is configured to process the plurality of data streams by executing program logic, which is also stored by the non-transitory storage medium 124. Using the program logic, the processor 122 is configured to convert the plurality of data streams to a continuous data stream.

Figure 2:
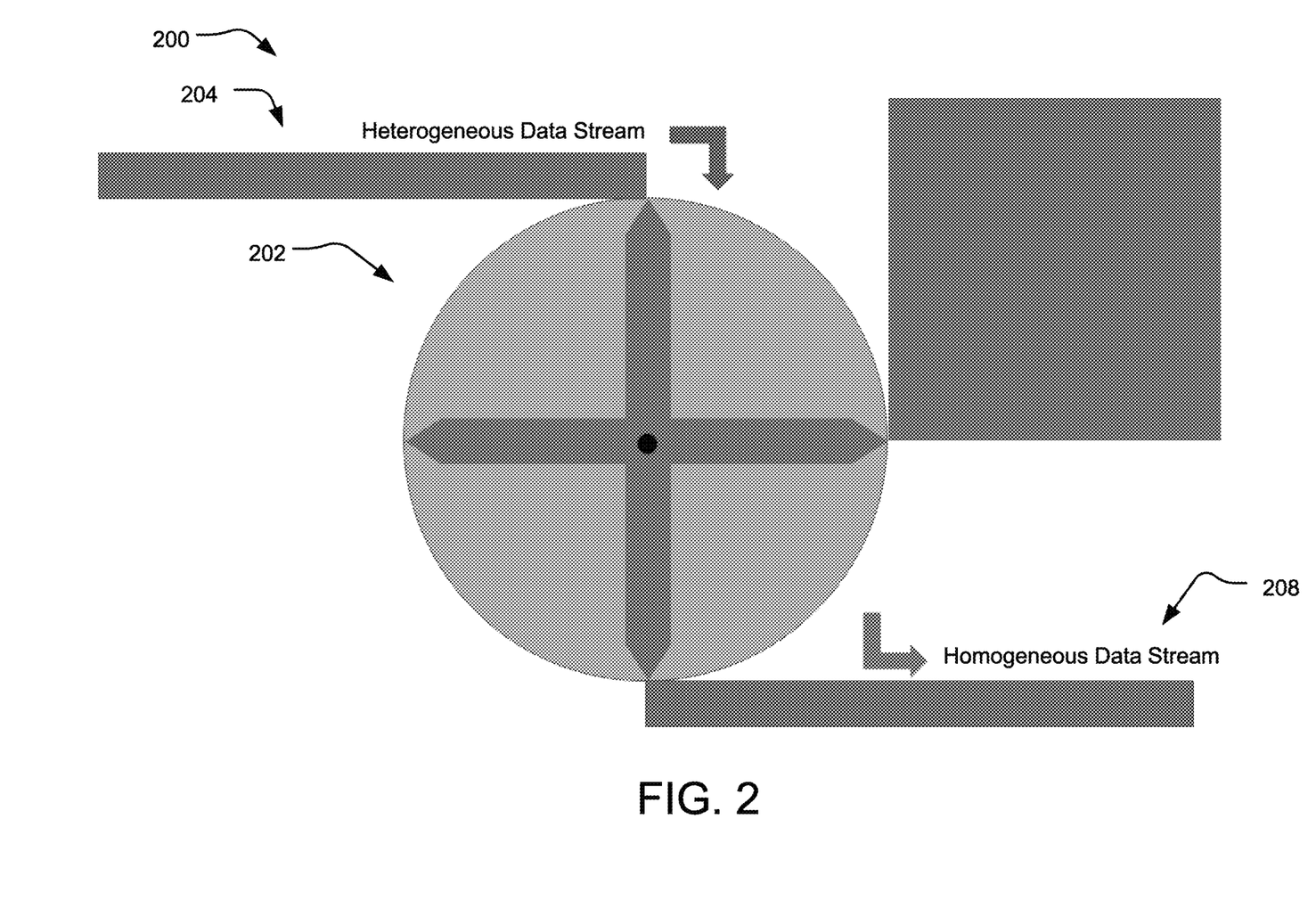
FIG. 2 is a diagram illustrating a data stream flow system of the present inventive concept.

The manner in which the present inventive concept receives and processes each of the plurality of data streams is comparable to an old-fashioned water wheel positioned along a flowing stream. The water wheel includes a plurality of buckets that can be sequentially filled with water from the flowing stream and dumped. As each bucket of the water wheel consecutively fills with water, the water wheel is caused to rotate. The rate at which the water wheel rotates is dictated by a flow rate of the flowing stream. Turning to FIG. 2, the system 100 of the present inventive concept includes a virtual water wheel 200 with a plurality of virtual buckets 202. Each of the plurality of virtual buckets 202 is configured to be sequentially filled with or receive data from at least one data stream 204. After one of the plurality of virtual buckets 202 is filled with data from the at least one data stream 204, the data is processed via the processor 122, e.g., converted to a continuous data stream 208, and dumped or output for further processing or analysis. In this manner, the at least one data stream 204 may be a heterogeneous data stream, e.g., a stream of data from multiple data sources such as multiple ones of the one or more of surface sensors 102, and the processor 122 is configured to convert the heterogeneous data stream to the continuous data stream 208, which is a homogenous data stream. The homogenous data stream enables the system 100 to provide a continuous and steady data stream independent of any factors associated with the heterogeneous data stream, e.g., content of the at least one data stream 204 and/or flow rate of the at least one data stream 204.

Figure 3:
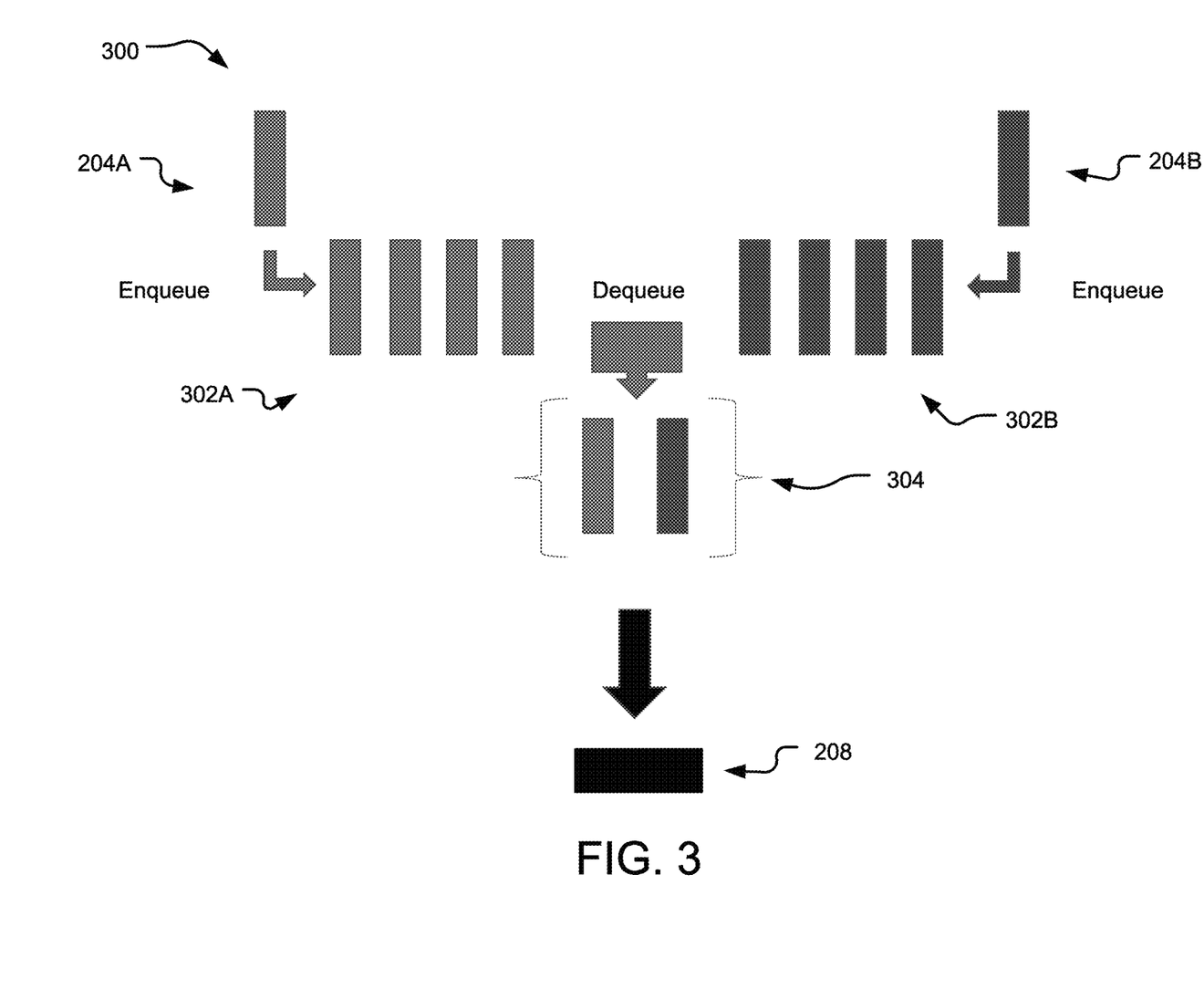
FIG. 3 is a diagram illustrating a queue of the system shown in FIG. 2.

Turning to FIG. 3, by executing logic stored in the non-transitory storage medium 124, the processor 122 of the system 100 is configured to form a queue 300 for receiving the at least one data stream 204, which includes a plurality of data streams 204A, 204B. The queue 300 is configured to receive the plurality of data streams 204A, 204B, process data received from each of the plurality of data streams 204A, 204B, and independently output the continuous data stream 208 regardless of a number of data streams or differences in dataflow rates between the plurality of data streams 204A, 204B. It is foreseen that the at least one data stream 204 can include one data stream, two data streams, or more than two data streams without deviating from the scope of the present inventive concept. The plurality of data streams 204A, 204B may be provided by, for example, measurement data generated by the one or more surface sensors 102 such as, but not limited to, a torque sensor, an acceleration sensor, a velocity sensor, and/or a rotations per minute (RPM) sensor of the drill string 110. In the exemplary embodiment, each of the plurality of data streams 204A, 204B is received in real time and at variable rates and/or with variable content. It is foreseen that each of the plurality of data streams 204A, 204B may be generated by different sources of data, include different types of data, and/or be received at different rates of data flow without deviating from the scope of the present inventive concept.

The queue 300 includes a plurality of enqueues 302A, 302B. Each of the plurality of data streams 204A, 204B are received by the queue 300 via a respective one of the plurality of enqueues 302A, 302B. Upon receipt of data from the plurality of data streams 204A, 204B by the queue 300 and processing of the data by the processor 122, the data may be stored in the non-transitory storage medium 124, a cache, or the like, which may be open ended or limited in capacity. The processor 122, via the queue 300, may be configured to order the data in a first-in-first-out manner, a last in-last-out manner, by priority, by a circular queue, or by other like manner of ordering data.

The queue 300 includes a dequeue 304, wherein one or more data points from each of the plurality of data streams 204A, 204B are converted, via the processor 122, to yield the continuous data stream 208, which is output from the queue 300 via the dequeue 304. During conversion, the processor 122 may aggregate each of the one or more data points from each of the plurality of data streams 204A, 204B to generate a current data point of the continuous data stream 208. It is foreseen that other forms of data organization may be used by the processor 122 such as, but not limited to, lists and/or stacks. It is foreseen that if one or both of the plurality of data streams 204A, 204B provide an amount of data, e.g., data points, that is too high to be processed by the processor 122, the processor 122 may be configured to discard data over a predetermined threshold and/or be configured to reduce the amount of data points entering the dequeue 304 from the queue 300, e.g., using a down sampling method.

The queue 300 is configured to output the continuous data stream 208 at a constant rate via the dequeue 304. The constant rate is selectively determined using a clock 126 of the computing device 128. For instance, the constant rate may be selectively determined by an operator of the system 100 by setting the clock 126. It is foreseen, however, that the constant rate may be selectively determined with or without the clock 126, e.g., as desired by the operator, and/or with or without the operator, e.g., automatically set by the clock 126 based on one or more factors associated with data received from one or more of the one or more surface sensors 102, without deviating from the scope of the present inventive concept.

The clock 126 is configured to continuously rotate the plurality of virtual buckets 202 and deliver each virtual bucket of data of the plurality of virtual buckets 202 at the constant rate. For instance, the constant rate, as determined or set via the clock, may be 100 Hz (100 packets per second). In the exemplary embodiment, the constant rate is not based on any of the flow rates at which each of the plurality of data streams 204A, 204B are received via the plurality of enqueues 302A, 302B. As such, the constant rate of the continuous data stream 208 is independent from the flow rates of the plurality of data streams 204A, 204B. For example, the processor 122 of the system 100 may receive a first data stream of the plurality of data streams 204A, 204B at a first data stream rate, receive a second data stream of the plurality of data streams 204A, 204B at a second data stream rate, and output the continuous data stream 208 at a continuous, third data stream rate via the dequeue 304. Each of the first data stream rate, the second data stream rate, and the third data stream rate may be different. As such, the third data stream is not determined by, based on, or otherwise affected by the first data stream rate or the second data stream rate.

The system 100, via the processor 122 and the queue 300, is configured to maintain the constant rate of the continuous data stream 208 by selectively introducing one or more new data packets into the continuous data stream 208 upon occurrence of a predetermined event. The one or more new data packets may be one or more empty data packets and/or one or more copies of one or more prior data packets. Each of the one or more new data packets may include one or more data points. In the exemplary embodiment, the predetermined event is a determination by the processor 122 that one of the plurality of data streams 204A, 204B is missing a data point of the one or more data points. There are a number of scenarios that may result in a missing data point. For instance, one of the plurality of data streams 204A, 204B may be experiencing a problem, e.g. a communication problem, a power problem, a connectivity/transmission problem, a disconnected data cable, a dead sensor, and/or a malfunctioning device. Or, a missing data point may indicate that there is no new data from the data source associated with the one of the plurality of data streams 204A, 204B with the missing data point. By selectively introducing the one or more new data packets into the continuous data stream 208 when a data point is not received by the processor 122, the system 100 is able to maintain an uninterrupted and continuous flow of the continuous data stream 208 at the constant rate.

It is foreseen that the system 100 may be configured to introduce the one or more new data packets into the continuous data stream 208 when one of the plurality of data streams 204A, 204B has a data flow rate that is faster than a data flow rate of another one of the one of the plurality of data streams 204A, 204B. In such a scenario, introduction of the one or more new data packets allow the system 100 to balance the plurality of data streams 204A, 204B, thereby allowing the system 100 to maintain the continuous data flow irrespective of any missing data points in the plurality of data streams 204A, 204B. It is also foreseen that the system 100 may be configured to introduce the one or more empty data packets and/or the one or more new data packets into the continuous data stream 208 when both of the plurality of data streams 204A, 204B have data flow rates that are slower than a data flow rate of the continuous data stream 208. In such a scenario, introduction of the one or more new data packets allows the system 100 to balance the plurality of data streams 204A, 204B with the continuous data stream 208, thereby allowing the system 100 to maintain the continuous data flow irrespective of a flow rate of any of the plurality of data streams 204A, 204B.

The continuous data stream 208 of the system 100 advantageously provides heightened control, monitoring, and visualization of the drilling operation. For instance, if the system 100 has introduced the one or more new data packets into the continuous data stream 208, the one or more new data packets can be interpreted to mean, e.g., determined via a control system of the computing device 128, that no new data is being received from one or more of the plurality of data streams 204A, 204B, e.g., that nothing has changed in the drilling operation, and/or that one or more of the plurality of data streams 204A, 204B is experiencing a problem, e.g. a communication problem, a power problem, a connectivity/transmission problem, a disconnected data cable, a dead sensor, and/or a malfunctioning device. In such a scenario, the system 100 of the present inventive concept may be configured to trigger an alarm or send a notification to the operator of the system 100 to indicate the presence of the one or more new data packets.

Introduction of the one or more new data packets into the continuous data stream 208 allow outputting of the continuous data stream 208 at the constant rate, which allows the data flow into the control system of the computing device 128 to remain continuous and not disjointed. In other words, the control system is not required to analyze multiple data streams received at different rates, which can be time intensive and complex. Rather, the control system can receive and analyze the continuous data stream 208, resulting in smoother controls of the drilling operation. The continuous data stream 208 can also provide monitoring of the drilling operation and can alert the operator or a monitoring system of the supporting facilities 104 to an issue associated with the drilling operation. Furthermore, the continuous data stream 208 can be displayed visually on a display of the supporting facilities 104 for the operator of the system 100 to manually observe, monitor, and/or control the drilling operation. For example, an uninterrupted and continuous stream of data facilitates an ability of the operator to maintain real-time control of a speed of a top drive of the drill string 110. Conversely, a disjointed stream of data impairs an ability of the operator to control the speed of the top drive. For example, the disjointed stream of data may result in the top drive continuously shutting off and turning on, which may be harmful to the drill string 110 and adversely affect efficiency of the drilling operation.

Figure 4:
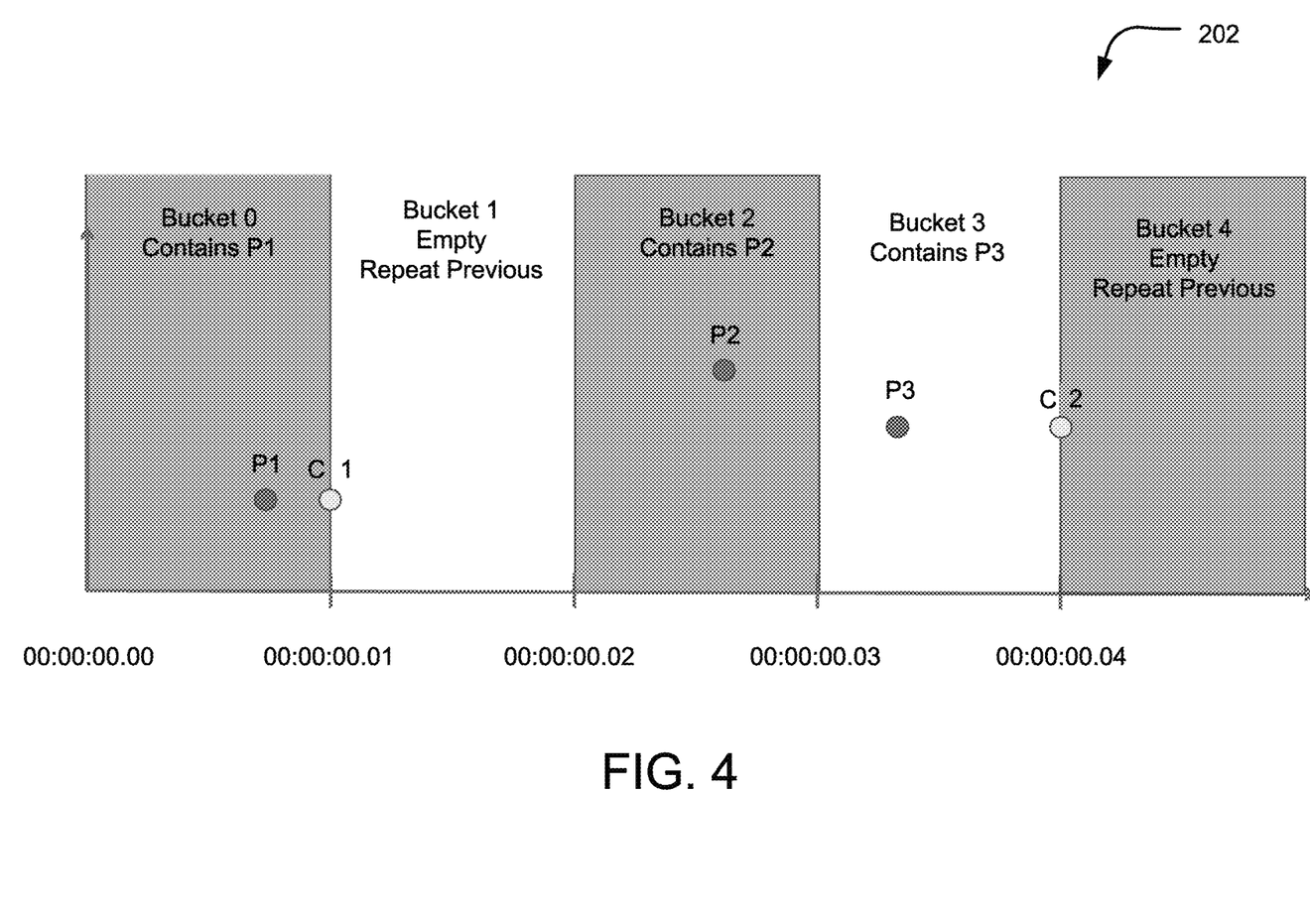
FIG. 4 is a diagram illustrating a plurality of raw data points.

FIG. 4 illustrates an example of the system 100 using one or more copies of a prior data packet as the one or more new data packets. In the example, the plurality of virtual buckets 202 includes Bucket 0, Bucket 1, Bucket 2, Bucket 3, and Bucket 4, which occur at 10 time intervals or increments via the clock 126. It is foreseen that other time increments may be used without deviating from the scope of the present inventive concept. The data stream 204A and/or 204B has supplied a plurality of raw data points P1, P2, P3, which have landed in various ones of the virtual buckets 202. The raw data points P1, P2, P3 have not been processed by the system 100 other than to be placed in the various ones of the virtual buckets 202. Moving from Bucket 0 to Bucket 4, the data stream 204A and/or 204B has supplied the raw data point P1 to Bucket 0 and has not supplied a data point to Bucket 1. As such, the system 100, via the processor 122, has generated new data point C1 by making a copy of a prior data point, i.e., the raw data point P1, which has been assigned, via the processor 122, to Bucket 1. Similarly, Bucket 2 has received the raw data point P2 and Bucket 3 has received the raw data point P3, and Bucket 4 has not received a data point. Because Bucket 4 is missing a data point, new data point C2 is generated by making a copy of a prior data point, i.e., the raw data point P3, which is assigned, via the processor 122, to Bucket 4. In this manner, the system 100 of the present inventive concept is configured to utilize prior data points to ensure the constant rate of the continuous data stream 208 having evenly-distributed data, e.g., 10 ms, from all sources of data.

Figure 5:
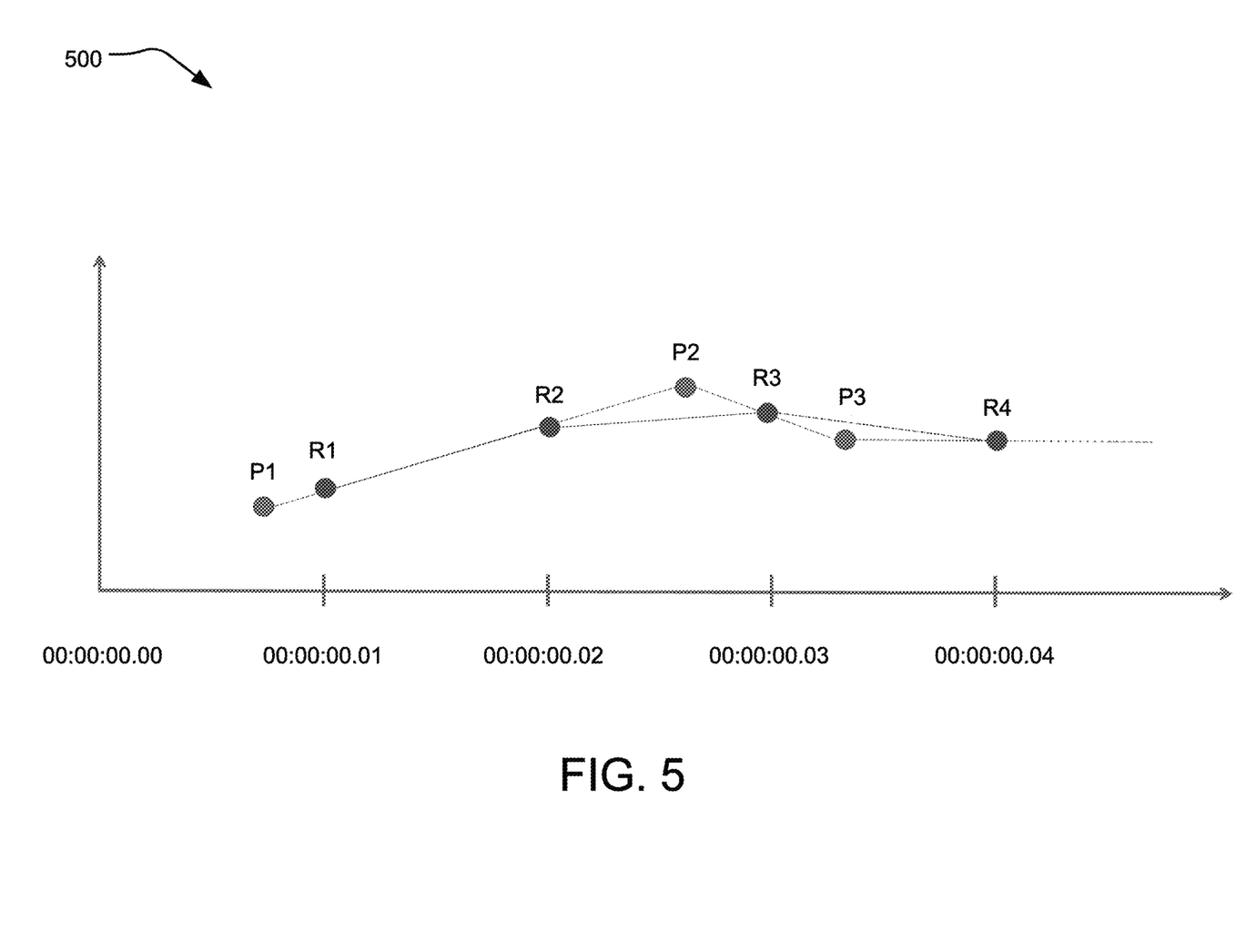
FIG. 5 is a graph illustrating an interpolation process to regularize raw data using the system shown in FIG. 2.

The continuous data stream 208 provided by the system 100 may be processed by the computing device 128 to facilitate smooth control of the drill string 110, for example, via regularization of data using an interpolation process, with or without the new data packets. FIG. 5 illustrates an interpolation process to regularize raw data, e.g., the raw data points P1, P2, P3 of the data stream 204A and/or 204B, without using any new data packets, e.g. without use of the virtual water wheel 200. The interpolation process, which is controlled by the clock 126 and/or the processor 122, causes each of the raw data points P1, P2, P3 to be interpolated at a time increment set by the clock 126, which generates a plurality of regularized data points R1, R2, R3, R4. In the exemplary embodiment the raw data points P1, P2, P3 are interpolated to create the regularized data points R1, R2, R3, R4 that are aligned on 10 ms boundary intervals. For illustrative purposes, the broken line extending between the regularized data points R3, R4 and the broken line extending beyond the raw data point P3 illustrate future data, e.g., data not yet received by the system 100. While the interpolation process without the new data packets, e.g., without use of the virtual water wheel 200, advantageously provides a smooth output, the regularized data points R1, R2, R3, R4 may not have a desired accuracy. For instance, the regularized data point R1, which is generated via interpolation using the raw data points P1, P2 within a first 10 ms increment, is illustrated as having a greater value than a value of raw data point P1. It is possible, however, that the regularized data point R1 may actually have a same value as the raw data point P1. If so, the regularized data point R1 is inaccurate and the interpolation process has generated a discrepancy. This discrepancy or gap in data can be problematic. To minimize a likelihood of any gaps in data, the system 100 is configured to account for possible gaps in data via use of an interpolation process with one or more of the new data packets.

Figure 6:
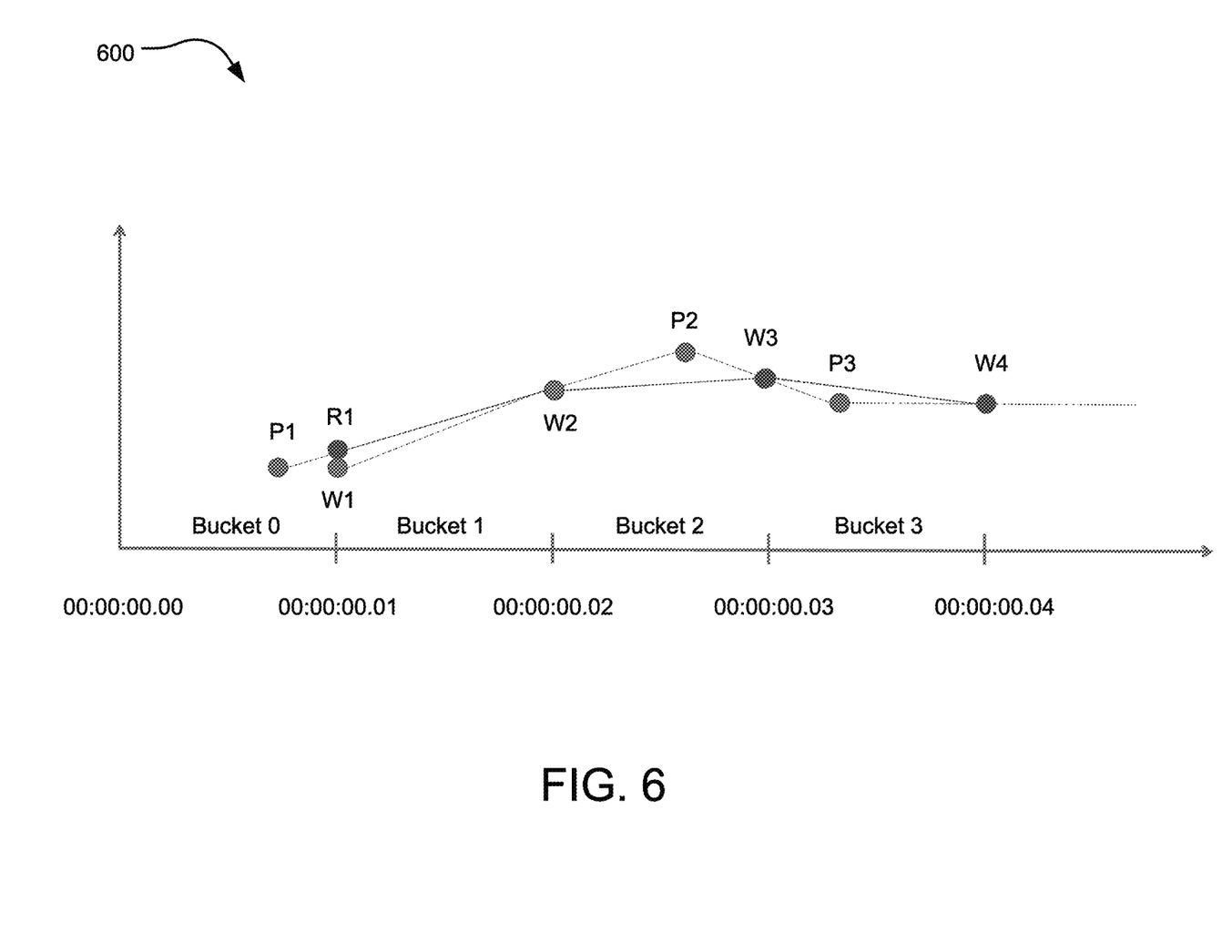
FIG. 6 is a graph illustrating the interpolation process to regularize the raw data using one or more new data packets and the system shown in FIG. 2.

Turning to FIG. 6, graph 600 illustrates regularization of the raw data points P1, P2, P3 using one or more new data packets, e.g., with the use of the virtual water wheel 200, which may be one or more copies of one or more prior data packets and/or one or more new data packets. This interpolation method generates one or more water wheel points, e.g., water wheel points W1, W2, W3, W4. In the example, each of the water wheel points W1, W2, W3, W4 are generated, via the processor 122, based on one or more of the raw data points P1, P2, P3. In this manner, if the system 100 encounters a gap in data between any of the raw data points P1, P2, P3, then one or more of the water wheel points W1, W2, W3, W4 are generated to account for the gap in data.

In the graph 600, each of the one or more water wheel points W1, W2, W3, W4 is interpolated, via the processor 122, from the raw data points P1, P2, P3 and/or assigned a copy of one of the raw data points P1, P2, P3 generated, via the processor 122, at a 10 ms interval such that the one or more water wheel points W1, W2, W3, W4 are evenly spaced apart from each other. As previously discussed, it is foreseen that a time interval less than 10 ms or larger than 10 ms can be used without deviating from the scope of the present inventive concept. In the example, the raw data point P1 occurs before the first 10 ms increment of the clock 126. As such, the system 100, via the processor 122, has generated the water wheel point W1 by making a copy of a prior raw data point, i.e., the raw data point P1, via the processor 122, in Bucket 1 at a first increment, e.g., the first 10 ms increment. In this manner, the system 100 anticipates that a value of data at the first 10 ms increment is equal to a value of the raw data point P1 and lower than a value of the regularized point R1. Next, the water wheel point W2 is generated at a next increment, e.g., the second 10 ms increment in Bucket 2, based on the raw data points P1, P2. Next, the water wheel point W3 is generated at a next increment, e.g., a third 10 ms increment in Bucket 3, based on the raw data points P2, P3. In the example, a data point was not received between a fourth 10 ms increment and a fifth 10 ms increment. As such, the system 100, via the processor 122, has generated the water wheel point W4 by making a copy of a prior raw data point, i.e., the raw data point P3, via the processor 122, in Bucket 4 at the fourth increment.

In the example, the water wheel points W2, W3, W4 are similar in value to the regularized data points R2, R3, R4 and, therefore, overlap the regularized data points R2, R3, R4. Yet, given the use of the one or more water wheel points W1, W2, W3, W4 generated to account for the gap in data, lines extending between the one or more water wheel points W1, W2, W3, W4 are likely to be a more accurate representation of the raw data points P1, P2, P3 than lines extending between the regularized data points R1, R2, R3, R4. As a result, a curve between the water wheel points W1, W2, W3, W4 matches and/or is similar to a curve between the raw data points P1, P2, P3, but avoids incurring latency in the system 100, which advantageously enables control of the system 100 with increased timeliness. For illustrative purposes, the broken line extending between the water wheel points W3, W4 and the broken line extending beyond the raw data point P3 illustrate future data, e.g., data not yet received by the system 100. In this manner, the continuous line extending between the one or more water wheel points W1, W2, W3, W4, which represents the continuous data stream 208, provides an improved regularization of the raw data points P1, P2, P3 at each time increment because the one or more water wheel points W1, W2, W3, W4 account for possible gaps in the data received from the data stream 204A and/or 204B at each time increment.

Figure 7:
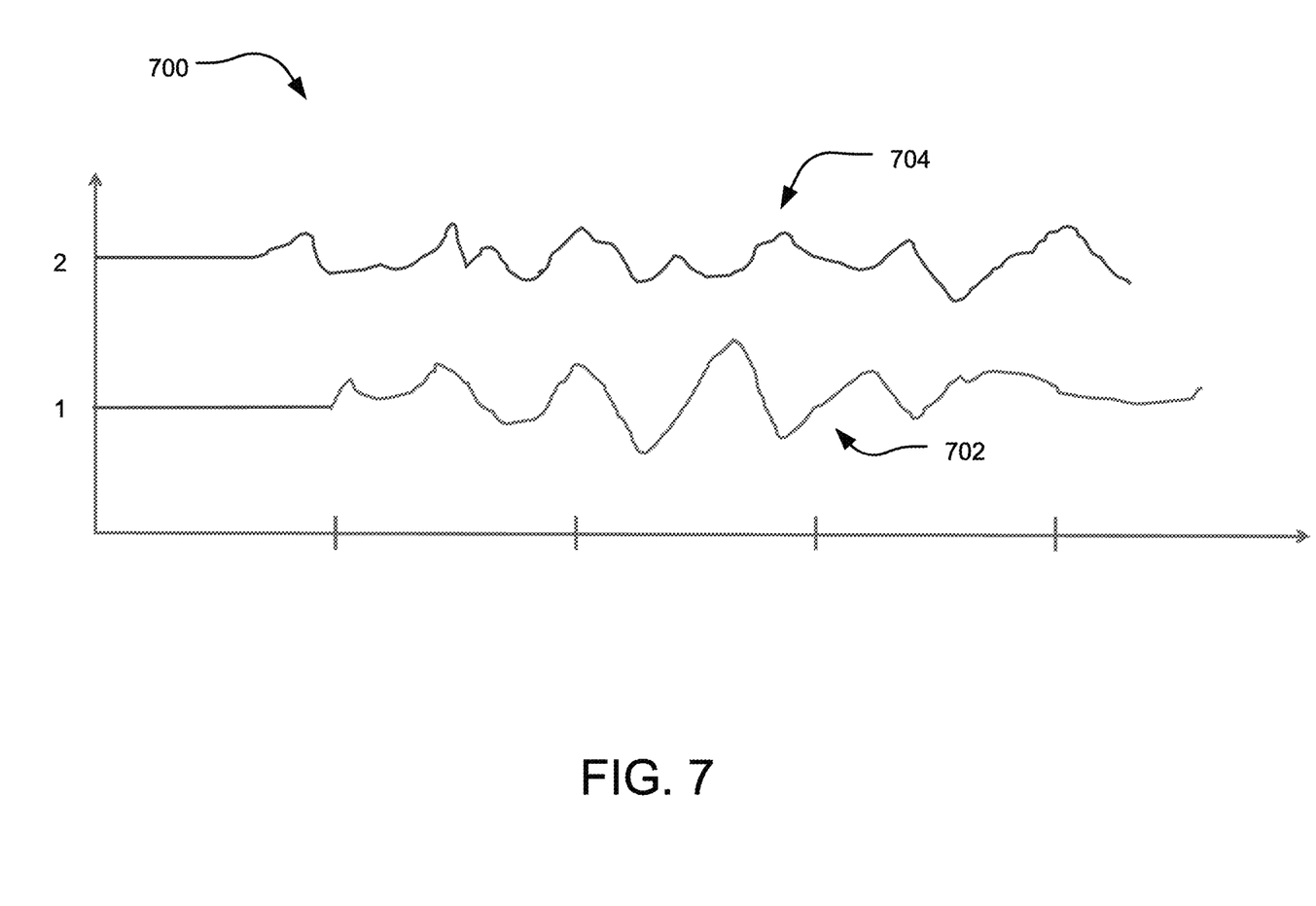
FIG. 7 is a graph illustrating a time alignment of a first and second signal generated from a first and second data stream using the system shown in FIG. 2.

A time alignment may be used on each of the plurality of data streams 204A and 204B to force alignment of each data stream entering the system 100. As illustrated by FIG. 7, a graph 700 illustrating example data streams generated during the drilling operation, with a first signal 702 received from a channel 1 containing raw data at a first time and a second signal 704 received from a channel 2 containing another set of raw data received at a second time. It is foreseen that the system 100 may receive one signal, two signals, or more than two signals without deviating from the scope of the present inventive concept. In the exemplary embodiment, the first signal 702 and the second signal 704 are generated from data received via the data stream 204A and/or 204B. In graph 700, the system 100 assigns, via the processor 122, a start time to the time alignment at which regularization of the first signal 702 and the second signal 704 begins based on a signal first received by the system 100, e.g. the second signal 704. It is foreseen that the system 100 may receive the first signal 702 before the second signal 704 without deviating from the present scope of the inventive concept. As such, the system 100 assigns the start time as a second rounded down from the second time of the second signal 704. The system 100 adds a null value to the first signal 702 and the second signal 704 prior the first time and second time, respectively, to prevent the system 100 from operating before data is received. In other words, a forced alignment of the first signal 702 and the second signal 704 advantageously allows the start time to correspond to the system 100 receiving data from both the first signal 702 and the second signal 704. In this manner, the time alignment results in the system 100 beginning operation when data is received from both the first signal 702 and the second signal 704.

Figure 8:
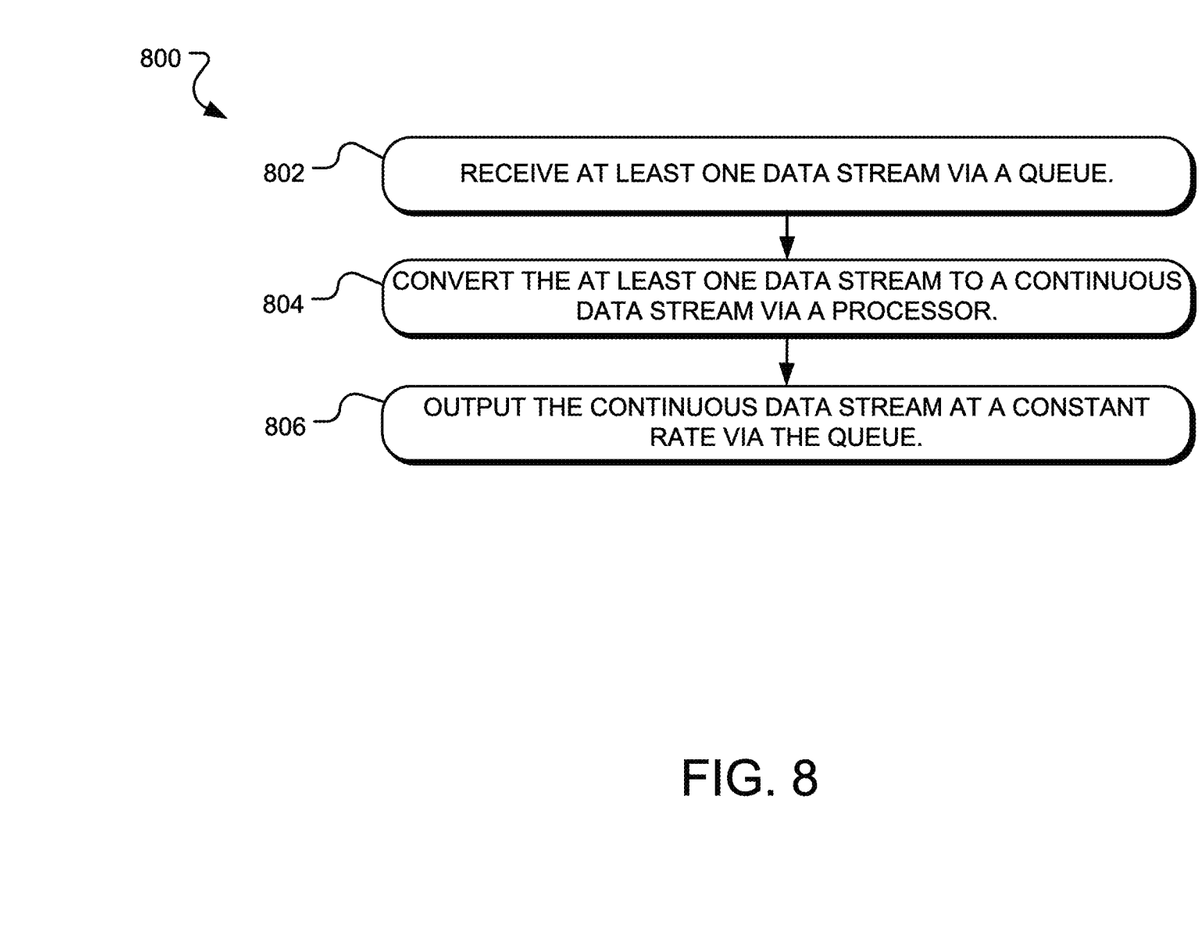
FIG. 8 is a flow chart illustrating a method to conform data flow using the system shown in FIG. 2.

Turning to FIG. 8, a flow chart illustrating a method 800 to conform data flow using the system 100 is shown. The method 800 is provided by way of example, as there are a variety of ways to carry out the method 800. The method 800, as described hereafter, can be carried out using the configurations and examples illustrated in FIG. 1A-7, for example, and various elements of these figures are referenced in explaining the method 800. Each block shown in FIG. 8 represents one or more processes, methods or subroutines, carried out in the method 800. Furthermore, the illustrated order of blocks is illustrative only and the order of the blocks can change according to the present disclosure. Additional blocks may be added or fewer blocks may be utilized, without departing from this disclosure. The method 800 can begin at block 802. At block 802, at least one data stream as previously discussed in relationship to FIGS. 1A-7 is received by a queue, such as in FIG. 3. The at least one data stream may be provided by measurement data generated by one or more surface sensors, such as in FIGS. 1A-B. At block 804, the at least one data stream is converted to a continuous data stream, as discussed above in relationship to FIGS. 2-5, by a processor, such as in FIG. 1A-1B. The at least one data stream may be organized and converted by any method discussed above. At block 806, the continuous data stream is outputted at a constant rate by the queue. The constant rate is determined via a clock, such as in FIG. 1B.

In this manner, the system 100 of the present inventive concept advantageously conforms data flow by receiving and converting at least one data stream to a continuous data stream and outputting the continuous data stream at a constant rate, thereby improving controls of a drill string.

It will be appreciated by those skilled in the art that changes could be made to the embodiments described above without departing from the broad inventive concept thereof. It is understood, therefore, that the present inventive concept disclosed herein is not limited to the particular embodiments disclosed, and is intended to cover modifications within the spirit and scope of the present inventive concept.

What is claimed is:

1. A method to conform data flow in a drilling system, the method comprising:
   receiving at least one data stream via a queue, the at least one data stream including drilling data for the drilling system;
   converting the at least one data stream to a continuous data stream;
   indicating a change in data received via the at least one data stream by introducing one or more new data packets into the continuous data stream via the queue, each of the one or more new data packets being a copy of at least one of a previous data packet or an empty data packet; and
   outputting the continuous data stream at a constant rate.

2. The method of claim 1,
   wherein,
   the at least one data stream includes a plurality of data streams,
   the queue includes a plurality of enqueues, and
   each one of the plurality of data streams is received via a respective one of the plurality of enqueues.

3. The method of claim 2, wherein each of the plurality of data streams is received in real time and at different rates.

4. The method of claim 1, wherein the constant rate is 100 Hz (100 packets per second).

5. The method of claim 2, wherein the constant rate is independent from each rate at which each of the plurality of data streams is received via the respective one of the plurality of enqueues.

6. The method of claim 1, further comprising:
   maintaining the constant rate by introducing one or more new data packets into the continuous data stream via the queue.

7. The method of claim 1, wherein each of the one or more new data packets is introduced into the continuous data stream when a data point is not received by the queue via the at least one data stream.

8. A method to conform data flow in a drilling system, the method comprising:
   receiving a plurality of data streams via a plurality of queues, each one of the plurality of data streams received at one of a plurality of times, the plurality of data streams including drilling data for the drilling system;

generating a plurality of signals based on the plurality of data streams;
applying a time alignment to the plurality of signals by (i) identifying a last signal of the plurality of signals, the last signal generated from a last received data stream of the plurality of data streams, and (ii) assigning a start time to the time alignment based on the one of the plurality of times that the last received data stream was received; and
outputting a continuous data stream at a constant rate after converting the plurality of signals to the continuous data stream beginning at the start time.

9. A system to conform data flow in a drilling system, the system comprising:
at least one sensor configured to measure drilling data of a drill string and output the drilling data as at least one data stream; and
at least one computing device configured to receive the at least one data stream in a queue, convert the at least one data stream into a continuous data stream, and output the continuous data stream at a constant rate, the system being configured to maintain the constant rate by introducing one or more new data packets into the continuous data stream.

10. The system of claim 9, wherein the at least one sensor is operable to be positioned at a surface of a wellbore.

11. The system of claim 9, wherein the drilling data is at least one of vibration data, weight on bit data, lateral acceleration data, rotations per minute data, tension data, flow rate data, temperature data, or pressure data.

12. The system of claim 9, further comprising:
a clock configured to determine the constant rate.

13. The system according to claim 9, further comprising:
a non-transitory storage medium configured to store the at least one data stream.

14. The system according to claim 9, further comprising:
a control system configured to control the drill string based on the continuous data stream.

15. A system to conform data flow in a drilling system, the system comprising:
at least one sensor configured to measure drilling data of a drill string and output the drilling data as a plurality of data streams, the at least one sensor operable to be positioned on a surface of a wellbore;
at least one computing device configured to receive each of the plurality of data streams at one of a plurality of times via a respective one of a plurality of enqueues and convert the plurality of data streams into a continuous data stream, the at least one computing device configured to convert the plurality of data streams into the continuous data stream by:
generating a plurality of signals based on the plurality of data streams, and
applying a time alignment to the plurality of signals by (i) identifying a last signal of the plurality of signals, the last signal generated from a last received data stream of the plurality of data streams, and (ii) assigning a start time to the time alignment based on the one of the plurality of times at which the last received data stream was received; and
a clock configured to determine a constant rate for output of the continuous data stream.

\* \* \* \* \*